United States Patent
Gillette

[15] 3,698,576
[45] Oct. 17, 1972

[54] SILAGE DISTRIBUTOR
[72] Inventor: Erwin H. Gillette, 1711 York Street, Lima, N.Y. 14485
[22] Filed: Dec. 19, 1969
[21] Appl. No.: 886,441

[52] U.S. Cl....................214/17 C, 193/16, 302/60
[51] Int. Cl..............................................B65g 65/32
[58] Field of Search...........214/17 C; 302/60; 193/16

[56] References Cited

UNITED STATES PATENTS

| | | |
|---|---|---|
| 2,752,204 | 6/1956 | Broughton....................302/60 |
| 3,357,749 | 12/1967 | Seymour et al. .....214/17 C X |
| 3,310,184 | 3/1967 | Dauer....................214/17 CB |

*Primary Examiner*—Robert G. Sheridan
*Attorney*—Charles Shepard and Stonebraker & Shepard

[57] ABSTRACT

A shifting deflector, driven by a small electric motor, is attached to the top of the conventional blower tube which blows silage up from the ground level to the top of a silo. To spread the silage evenly over the area of a large silo, the deflector is moved through an orbital path tilted sharply downwardly to deflect the incoming silage to the near side of the silo, during part of the orbital movement, and raised up to an almost horizontal position for deflecting the incoming silage to the far side of the silo, and moving through various intermediate positions to direct the silage rightwardly and leftwardly. A crank arm driven by an electric motor operates a follower crank arm eccentric to the first crank arm, which controls the orbital position of the deflector, and the eccentricity of the two crank arms relative to each other results in the motion being slower when the silage is directed to a position farther away from the blower tube, and faster when the silage is directed to a position closer to the blower tube, thus producing a more even filling throughout the entire area of the silo. The orbital movement produced by the crank arms includes a lateral twisting motion superimposed on the main orbital motion. A supplementary deflector pivoted to the discharge end of the main deflector is operated by a linkage to assist in directing the flow of silage to the near side of the silo during the appropriate part of the orbital movement.

13 Claims, 18 Drawing Figures

SILAGE DISTRIBUTOR

BACKGROUND OF THE INVENTION

On modern mechanized farms, it has been common practice for many years to fill a silo by means of a blower at ground lever, blowing the silage up a tube or conduit rising vertically outside the silo and curving into the silo through an appropriate door in the roof. Many times the curved discharge end of the delivery tube, entering the door in the roof and then directed downwardly, is stationary. It has been found in practice that this does not fill the silo evenly, but produces a fill of somewhat conical shape. Also, the silage in the direct line of discharge is compacted to a greater degree than the surrounding silage, and constitutes a hard core which may result in heating and moulding of the silage, and may also produce damage to the silo by uneven pressure on the walls thereof.

Many attempts have been made to produce more even filling of a silo than can be produced by a stationary deflector or nozzle at the discharge end of the blower tube. Examples of some of the constructions which have been proposed for increasing the evenness of fill of the silo, are the constructions shown in the following U.S. Pats. Cymara Pat. No. 3,158,407 of Nov. 24, 1964; Stoltzfus Pat. No. 3,175,668 of Mar. 30, 1965; Smiley Pat. No. 3,262,586 of July 26, 1966; and Freeman Pat. No. 3,337,065 of Aug. 22, 1967. In spite of the great amount of work which has been done in trying to improve the filling of silos, the prior constructions do not solve the problem in a completely satisfactory manner. Either they do not fill the silo sufficiently evenly, or they are unnecessarily complex and complicated and likely to get out of order, or they are unduly expensive.

The present invention provides a movable distributor for installation at the discharge end of the stand pipe coming up from the blower, which distributes the silage in a sufficiently uniform manner to make a satisfactory fill of the silo, and at the same time the parts of the distributor mechanism are relatively simple, compact, sturdy, and inexpensive to manufacture and install.

An object of the invention is the provision of generally improved and more satisfactory mechanism for distributing silage reasonably uniformly throughout the area of the silo, even if the silo is of rather large diameter as common in modern practice.

Another object is the provision of a distributor which can be readily attached to the upper section of a silage blower tube, and may be readily removed when required.

Still another object is the provision of a silage deflector driven by an electric motor through what may be called a continuous orbital movement to direct the flow of silage to different parts of the area of the silo, the drive being such that the movement through the continuous orbit is faster while the silage is being directed to the near side of the silo and slower while the silage if being directed to the far side, in order to promote uniform filling throughout the entire area.

A further object is the provision of such a deflector in which a lateral tilting movement is superimposed on the orbital swinging movement, to promote a still greater degree of uniformity of filling the silo.

A still further object is the provision of a construction in which a supplementary deflector is pivotally mounted at the discharge end of the main deflector and is operated by a linkage system to assist in directing silage to the near side of the silo, so that the main deflector itself does not have to swing downwardly to such a great angle as would otherwise be required.

BRIEF DESCRIPTION OF THE DRAWINGS

The following drawings, which are incorporated herein by reference and which constitute a material part of the disclosure, illustrate a preferred embodiment of the invention, as an example rather than as a limitation on the invention, it being understood that many details are capable of wide variation.

DESCRIPTION OF THE PREFERRED EMBODIMENT

Figure 17:
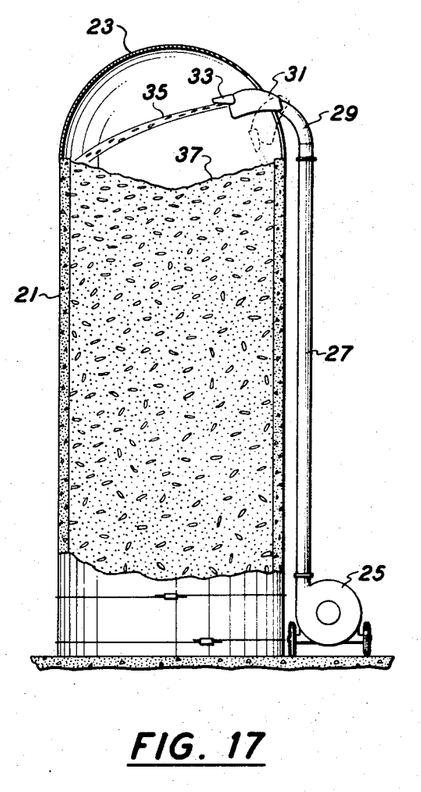
FIG. 17 is a schematic side elevation, with parts broken away, of a silo with the present silage distributor installed, illustrating the manner in which the present distributor fills the silo.

Referring first to FIG. 17, there is shown somewhat schematically a silo indicated in general at 21 having the usual domed roof 23. A conventional silage blower, indicated in general 25, blows the shredded silage up a vertical standpipe or delivery tube 27 to a curved terminal portion 29 located at a door opening in the roof of the silo, the silage issuing at high velocity from the outlet end or nozzle of the this curved section 29, and being guided by the distributor of the present invention, comprising a main distributing deflector or chute 31 and a supplementary deflector or chute 33. According to the present invention, the parts 31 and 33 move in an orbital movement from side to side and also up and down, and also tilt sideways first to one side and then to the other, the result being that the stream of silage projected from the device, as at 35, follows an orbital path around the walls of the silo, filling the silo fairly evenly all the way around, through the entire cross sectional area of the silo, even if it is a relatively large silo having a diameter of 15 or 20 feet or more. In FIG. 17, the silage is illustrated as having been built up to a level shown at 37, of slightly dished form since the silage is deposited mainly around the walls of the silo, but enough of it falls into the central part of the silo so that it is only slightly dished, and reasonably level at the conclusion of the filling operation.

Figure 18:
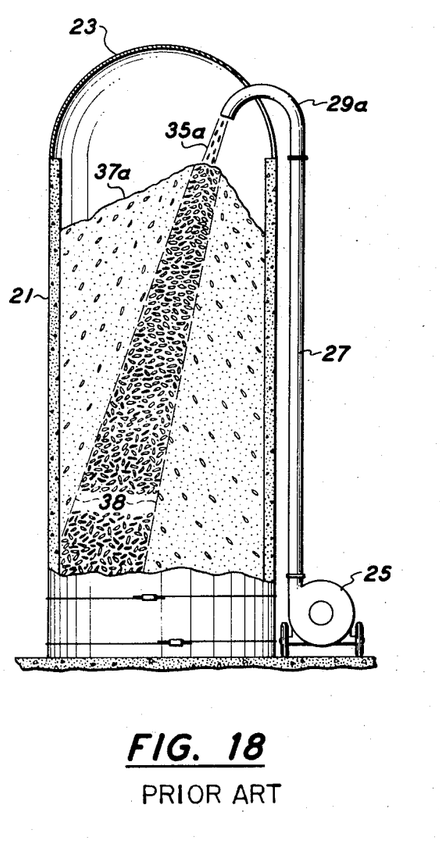
FIG. 18 is a similar side elevation, with parts broken away, of one of the prior art forms of silage distributor, using a fixed nozzle or deflector, illustrating the manner in which it fills the silo, for purposes of comparison with the present invention as illustrated in FIG. 17.

For the sake of comparison, reference is made to FIG. 18, showing one form of prior art silo filling mechanism. The parts 21—27 are the same as before. The vertical pipe 27, in this prior art form, terminates in a curved or gooseneck terminal portion 29a which is stationary and which discharges from the nozzle end in an obliquely downward direction, the stream of silage being indicated at 35a. It is directed in general toward the center of the silo, and the silage builds up in a conical formation as indicated by the surface 37a. This gives uneven pressure against the walls of the silo, resulting in eccentric stress and sometimes damage to the silo structure. Moreover, and more seriously, it is found in practice that the silage contains a central core, approximately between the broken lines 38, which is more firmly compacted and more dense than the looser material around this central core, with the result that it interferes with the proper curing action of the silage within the silo. The filling of a silo from the conventional stationary gooseneck 29a, indicated in FIG. 18, is far from satisfactory.

As already mentioned, previous attempts have been made to overcome the defects and disadvantages of using a stationary outlet nozzle as in FIG. 18, and to obtain more even distribution of the silage in the silo. However, the prior constructions still leave much to be desired. Some are so delicate as to get out of order easily. Others are unduly complex, or difficult to service, or too heavy to be practical, or too expensive. The present construction provides an improved distributing arrangement which overcomes the prior art disadvantages just mentioned, and which gives excellent distribution of the silage within the silo, while at the same time being composed of a few simple parts, sturdy in operation, not likely to get out of order, fairly light in weight, and which are easy and inexpensive to construct, maintain, and operate.

Referring now to FIGS. 1—5 in general, the present construction includes various frame parts rigidly connected to each other and indicated in general by the numeral 41, rigidly supported from the standpipe or delivery tube 27 and its curved part 29. The details of the frame members 41 are not important for purposes of the present invention, and they may be varied at will, so long as they provide a rigid support for the various moving parts and pivot points of the present mechanism. The upper portion of the delivery tube 27 is detachably anchored to the upper part of the silo 21 by any conventional means such as the chain 42 (FIG. 2) and bracket 44 secured permanently to the silo, detachable connection being desireable so that the blower, the standpipe, and the distributor mechanism of the present invention may be readily moved from one silo to another and may be used repeatedly for filling various different silos, whether of the same or of various different diameters. The curved terminal portion 29 of the delivery tube, and the distributor mechanism supported thereby, extend inwardly over the upper edge of the silo 21, through the usual conventional door in the domed roof of the silo.

Mounted on a suitable stationary part of the frame 41 is a yoke 43 rotatable about a vertical pivot or pintle relative to the stationary frame. The two upstanding arms of the yoke 43 carry inwardly extending horizontal pivot pins 45 which engage in openings in the bearing sleeve 47, through which a control rod 49 extends. Collars 51 and 53 fixed to the rod 49 in front of and behind the bearing sleeve 47 prevent longitudinal movement of the rod 49 through the baring sleeve, while permitting it to turn therein. With this arrangement, the rod 49 is able not only to turn, but also to swing orbitally in any direction, either vertically or horizontally or in a combination of the two.

Figure 1:
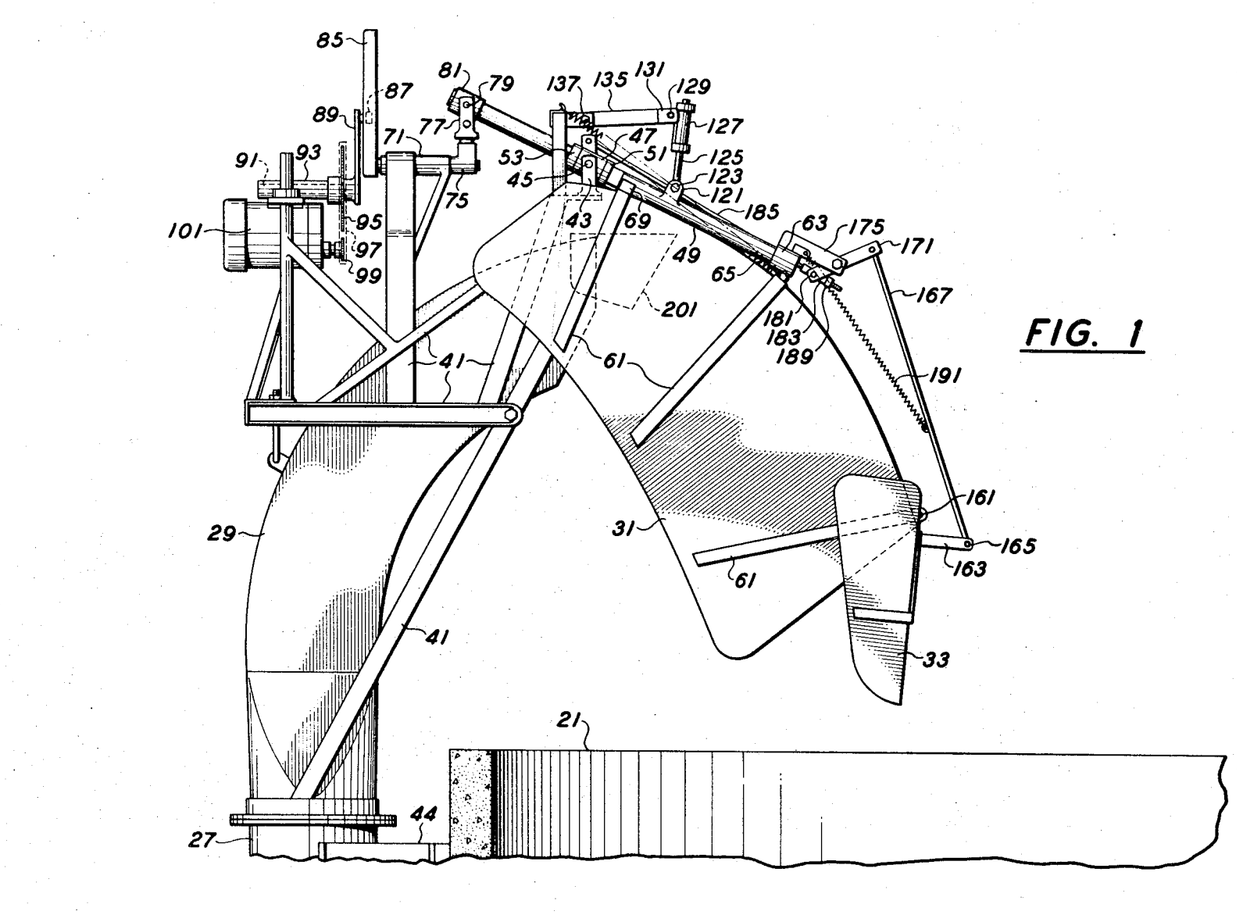
FIG. 1 is a side elevation of the distributor mechanism, including the deflectors and the drive mechanism therefor, in what may be termed an initial or zero position of the orbital movement, for distributing silage to the near side of the silo.
Figure 2:
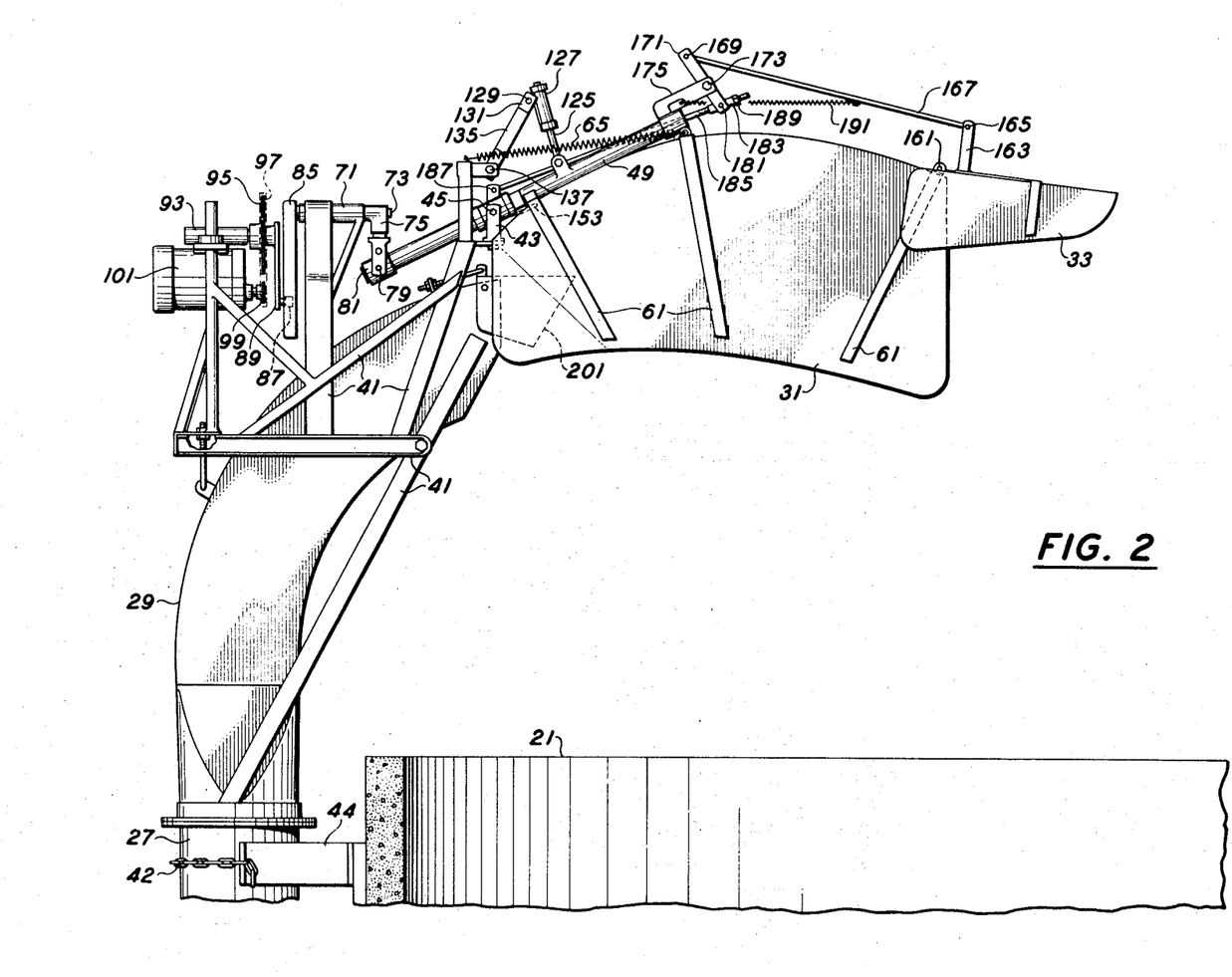
FIG. 2 is similar view of the parts in an orbital position 180° from the position shown in FIG. 1, for distributing silage to the far side of the silo.
Figures 4, 5:
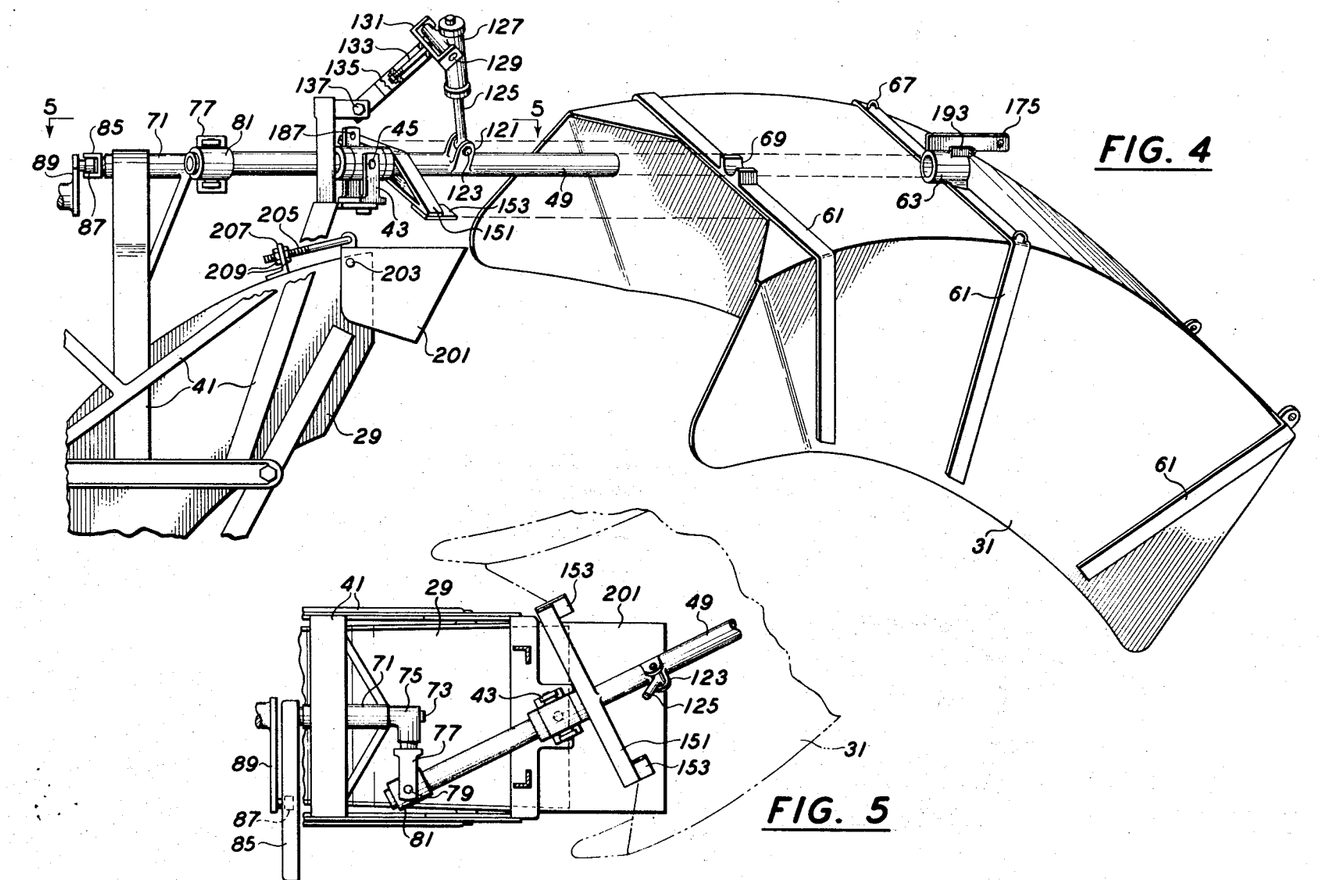
FIG. 4 is an exploded perspective view, with parts omitted and parts broken away, showing the mechanism in an intermediate position between the position of FIG. 1 and the position of FIG. 2, the position in FIG. 4 being conveniently referred to as the 90° orbital position.
FIG. 5 is a fragmentary top plan view of the parts in the position shown in FIG. 4.

Mounted on what may be called the forward end of the rod 49 (the right hand end when viewed as in FIGS. 1—5) is the main distributor or deflector chute 31 previously mentioned. This is a sheet metal chute with its top wall longitudinally curved as best seen in FIGS. 1, 2, and 4, and with side flanges depending from opposite marginal edges of the top wall, and open at the bottom. It does not matter whether the top wall is curved only in a longitudinal direction and is straight in a lateral or transverse direction, as illustrated in the drawings, or whether it is curved also in the lateral or transverse direction, merging with the side walls. The function and operation would be the same in either case, but it is easier to fabricate it from sheet metal if the top wall is curved only in one direction as shown, and straight in the other direction, whereupon the side walls can be welded to the edges of the top wall, whereas a die stamping is required if the top wall is curved to merge with the side walls. In either style of construction, the silage issuing from the exit end of the blower tube 29 is delivered into the deflector 31 near the rear end thereof, and is deflected thereby in one direction or another, depending on the position of the chute 31 at the moment.

If the chute 31 is fabricated of sheet metal as above mentioned, it is preferably strengthened in various places by bars of thicker metal welded to the outside surfaces of the sheet metal, some of which strengthening or stiffening bars being seen at 61. The central bar 61, where it goes across the top wall of the chute, is welded to a tubular socket member 63 which is impaled on the front end of the control rod 49, to form a convenient way of mounting the chute on and supporting it from the control rod. Springs 65 (FIGS. 2 and 3) are fastened at their rear ends to part of the fixed frame 41, and fastened at their forward ends to rings 67 on the middle one of the crosswise strengthening members 61 of the chute, and these springs 65 draw rearwardly on the chute to keep the socket 63 engaged with the forward end of the control rod 49. The rear edge of the chute overlies and is supported by pads or ears 153 on a cross arm 151 on the rod 49, thereby keeping a saddle bearing 69 near the rear end of the chute engaged tightly with the underside of the control rod 49 just forwardly of the collar 51. When the control rod 49 swings orbitally, it will carry the chute 31 with it.

To produce the desired orbital movement of the control rod, in order to move the deflecting chute to various positions so as to give reasonably uniform distribution of the silage, there is an orbital drive mechanism which not only moves the control rod through an orbit but also produces a very desirable variation in the speed of movement in different parts of the orbit. On a suitable part of the fixed frame 41 is a journal or bearing 71 in which a short shaft 73 rotates. This shaft 73 is preferably horizontal and in alinement with the center of the bearing sleeve 47. An arm 75 is fixed to the front end of this shaft, and a yoke 77 is pivoted to the arm 75 to rotate on a pivot pin which is radial with respect to the shaft 73. The arms of the yoke carry inwardly extending pins 79 which engage openings in a bearing sleeve 81 on the rear end of the control rod 49. The pivotal arrangement is essentially the same as that of the yoke 43 and bearing sleeve 47, except that the yoke 43 is pivotally mounted on a stationary frame member, while the yoke 77 is pivotally mounted on the arm 75 which is fixed to and rotates bodily with the shaft 73. As the shaft 73 rotates, the arm 75 and yoke 77 will carry the bearing sleeve 81 around a circle, and thus the rear end of the control rod 49 will describe a circle, and the front end of the control rod will describe a similar circle but will be 180° out of phase with the rear end.

The rear end of the shaft 73 is fixed to a radial arm 85 which, for convenience, is preferably in the same radial plane as the arm 75 and yoke 77, but not necessarily so. This arm 85 has a radial slot engaged by a roller 87 on an arm 89 secured to the forward end of a shaft 91 parallel to but offset radially from the shaft 73. This shaft 91 rotates in a journal or bearing 93 which is adjustably mounted on the fixed frame 41 to adjust the degree of offset or eccentricity of the shaft 91 relative to the shaft 73. The shaft 91 also has fixed to it a sprocket 95 driven by a drive chain 97 from a sprocket 99 on the power shaft of a small electric motor 101, the sprocket 99 preferably not being on the armature shaft of the motor but rather on a speed reduction driven shaft at the takeoff end of speed reducing gearing built into the housing of the motor 101. The motor is preferably rigidly connected to the bearing 93 of the shaft 91, so that the motor and the shaft bearing 93 remain in fixed position relative to each other and are adjusted together as a unit, on the fixed frame 41, when it is desired to adjust the eccentricity or offset of the shaft 91 relative to the shaft 73.

If the drive shaft 91 is in direct axial alinement with the driven shaft 73, the shaft 73 will be driven at the same uniform speed as the drive shaft 91. However, when the drive shaft 91 is eccentric with respect to the driven shaft 73, as illustrated in FIGS. 1 and 2, the driven shaft 73 will be driven through the same number of revolutions as the drive shaft 91, but the motion of the driven shaft will be non-uniform, being faster in those portions of each revolution where the drive roller 87 is closer to the axis of the shaft 73 than it is to the axis of the shaft 91, and being slower in those portions of each revolution wherein the drive roller 87 is further from the axis of the shaft 73 than it is from the axis of the shaft 91. This difference in speed of rotation in different parts of each revolution of the shaft 73 will be further explained below in connection with the speed diagram, FIG. 15. When the shaft 91 is offset below the shaft 73, which is the position shown in FIGS. 1 and 2, it follows that the fastest part of the revolution of the shaft 73 will be when the arm 85 is moving through the upper part of its swing, and during this part the bearing 81 at the rear end of the control rod 49 will also be moving through the upper part of its swing, so that the forward end of the control rod will be in the lower part of its swing, and the chute 31 will be pointed sharply downwardly, as shown in FIG. 1. The slowest part of the rotation of the shaft 73 will be while the arm 85 is swinging through the lower part of its swing, and the bearing 81 will likewise be in the lower part of its swing, so the forward end of the control rod 49 will be near the top of its swing, and the chute 31 will be near the top of its orbital swing, as in FIG. 2. At this time, the chute will be directing the flow of silage to the far side of the silo, or side remote from the side at which this mechanism is mounted, and it is desirable to have the chute swing more slowly at this time, because the delivered silage must cover a greater area of the silo, per degree of swinging movement, than when the deflecting chute is swinging through the same number of degrees to deposit silage at the near side of the area of the silo.

In addition to the swinging movement caused by the orbiting of the control rod 49, it is also desirable to tilt the chute 31 sidewise, for better delivery of the silage at the right and left sides of the silo, with relation to the position where the device is installed. To accomplish this side tilting, the control rod 49 is provided with a pair of upstanding ears 121 having a pivot 123 extending across between them, on which there is pivoted an upstanding rod 125, the upper end of which extends slidably into a sleeve 127 pivotally mounted on a crosswise pivot 129 extending between the ears of a yoke 131. This yoke 131 has a pivot pin 133 perpendicular to the axis of the pin 129 and extending longitudinally and rotatably in an arm structure 135 mounted to swing upwardly and downwardly on the horizontal pivot 137 on a fixed part of the machine frame.

Figure 3:
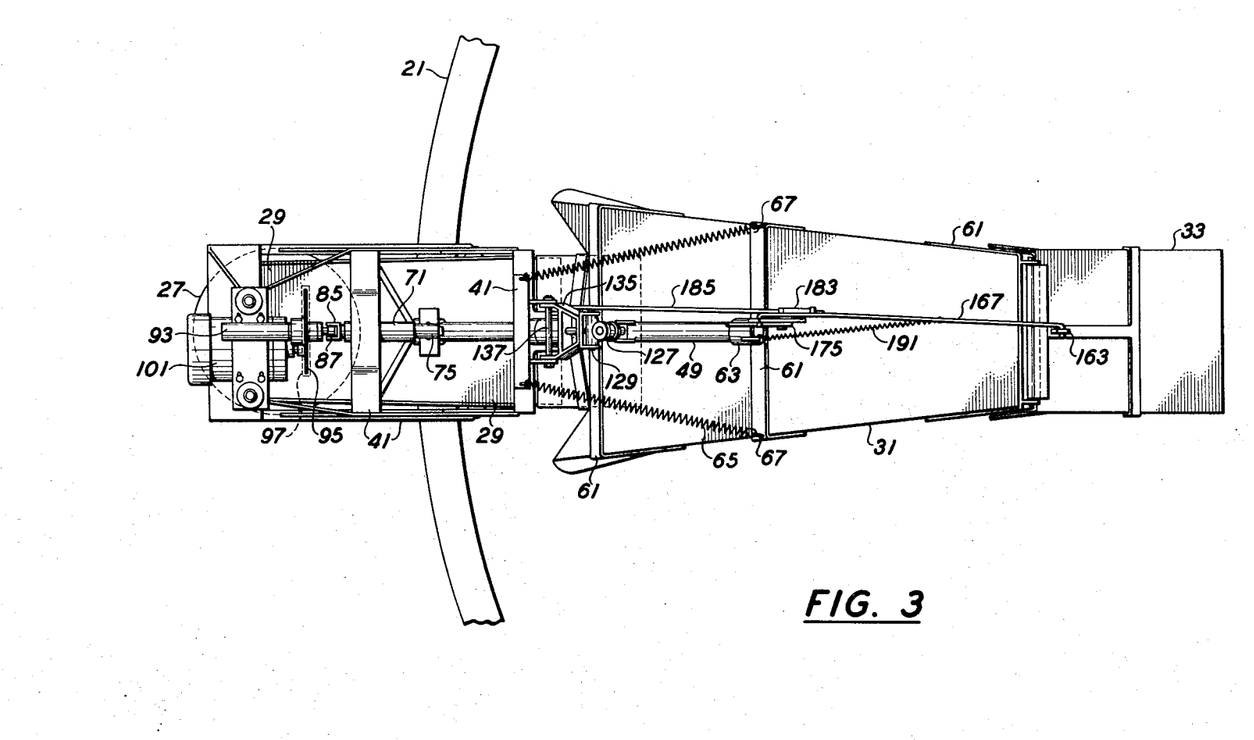
FIG. 3 is top plan view of the parts in the position shown in FIG. 2.

The structure of the arm 135 is rather wide in the direction of the pivotal axis 137, as best seen in FIG. 3, so that it has great rigidity against deflection or distortion in the direction of this axis 137, but can swing freely upwardly and downwardly on this axis 137. When the control rod 49 is in what may be called the zero or starting position shown in FIG. 1, with the driven arm 85 and the follower arm 75 of the drive mechanism extending vertically upwardly from the shaft 73, the arms 85 and 75 and the rod 49 and the rod 125 all lie in the same vertical plane, and there is no sideways twist of the chute 31. Such a vertical plane makes a convenient reference plane for simplifying the description of the movement, and will be referred to as the vertical reference plane, defining the zero position of the movable parts. As the motor turns the crank arms 89 and 85 clockwise from this zero position (clockwise when viewed from the rear, or from the left end of FIGS. 1, 2, and 3, looking toward the right in these views) the arm 75 causes the rear end of the control rod 49 to swing rightwardly and downwardly on an arc, while the front portion of the rod 49 (forwardly of the trunion 43) swings on an arc leftwardly and upwardly. But since the arm 135 cannot move leftwardly, it stays with its center in the vertical reference plane, but the sleeve 127 can turn on the yoke pivot 133, so that the rod 125 can follow the leftward arcuate motion of the control rod 49. Because of the pivotal connection 123 between the rod 125 and the control rod 49, this twists or tilts the control rod 49, in a clockwise direction (viewed from the rear), so that the chute 31 faces not directly downwardly but obliquely downwardly and to the left, during this part of the orbital travel of the rod 49. The twisting or turning of the rod 49 is transmitted to the chute 31 by diametrical arms 151 (see especially FIGS. 4 and 5) which are welded or otherwise rigidly secured to the rod 49 and which have forwardly projecting pads or ears 153 which underlie the rear edge of the top wall of the chute 31, to support the rear end of the chute and also to transmit any turning of the rod 49 on its longitudinal axis to the chute.

Similarly, as the forward portion of the rod 49 completes the leftward and upward orbital swing and comes back to the central position in the vertical reference plane, the chute swings back to the central untwisted position, and then as the other half of the orbital motion continues, the chute is twisted rightwardly so that the open bottom of the chute faces obliquely rightwardly and downwardly, facilitating distribution of silage to the right hand side of the silo area.

It has been briefly mentioned above that this main distributing or deflecting chute 31 has a supplementary chute 33 at the far or inner end thereof. The supplementary chute is of similar cross section, a trifle wider so that the side walls thereof will overlap outside of the side walls of the main chute, and is pivoted to the top of the main chute on the pivot 161. An upstanding arm 163 rigidly secured to the top wall of the supplementary chute is pivoted at 165 to the forward end of a link 167, the rear end of which is pivoted at 169 to the upper end of a reversing lever 171 pivoted at an intermediate point 173 to a bracket 175 secured to the socket fixture 63. The lower arm of the reversing lever 171 is pivoted at 181 to a sleeve 183, through which passes the forward end of a rod 185, the rear end of which is pivoted at 187 to an upward extension on one of the arms of the yoke 43. A stop 189 at the front end of the rod 185 limits the extent to which the sleeve 183 may move forwardly on the rod. A spring 191 has its rear end anchored at 193 to the socket member 63, and its forward end secured to the rod 167 to tend to pull the rod rearwardly, thereby constantly tending to move the lower end of the reversing lever 171 forwardly to keep the sleeve 183 against the stop 189.

With this arrangement, when the main chute 31 is in its uppermost position, alined with the vertical reference plane, the supplementary chute 33 will be raised to its highest position, as shown in FIG. 2. As the main chute 31 moves downwardly (also swinging laterally during such downward movement) the downward motion relative to the pivot 187 causes the rod 185 to pull rearwardly on the lower end of the reversing lever 171, which in turn pushes forwardly on the rod 167 against the force of the spring 191, thereby pushing forwardly on the post 163 which is rigid on the supplementary chute 33, thereby swinging the chute 33 downwardly on its pivot 161. The result is that when the main chute 31 reaches its downward limit of motion, again in the vertical reference plane, the supplementary chute 33 has been shifted to the position shown in FIG. 1, helping to direct the flow of silage against or close to the near side of the silo. Without the supplementary chute, it would be necessary to curve the discharge end of the main chute 31 more sharply, in order to get the silage to the near side of the silo, and if it were curved more sharply, then in the upper position shown in FIG. 2, it would deflect the silage downwardly too much so that it would not properly reach the far side of the silo, when the silo was nearing its full capacity. The supplementary pivoted chute takes care of this very well.

Depending somewhat on the size and shape of the discharge end of the curved blower tube 29 in comparison to the size and the shape of the main deflector chute 31, it may be advisable to provide an intermediate deflecting member between the end of the blower tube 29 and the movable chute, and to make this intermediate member adjustable. This construction is best shown in FIG. 4, and shown also in broken lines in FIGS. 1 and 2. The intermediate member is a relatively small and short deflector 201 of inverted U-shaped cross section, pivoted at 203 to the stationary end of the tube 29 and having its position controlled by a link 205 passing through a fixed bracket 207. Nuts 209 threaded on the link 205 on opposite sides of the bracket 207 can be screwed one way or the other to cause the deflector 201 to tilt somewhat more upwardly or downwardly, in order to get the best flow of the silage from the tube 29 into the chute 31, with the least resistance.

Figures 6, 7, 8, 9, 10, 11, 12, 13:
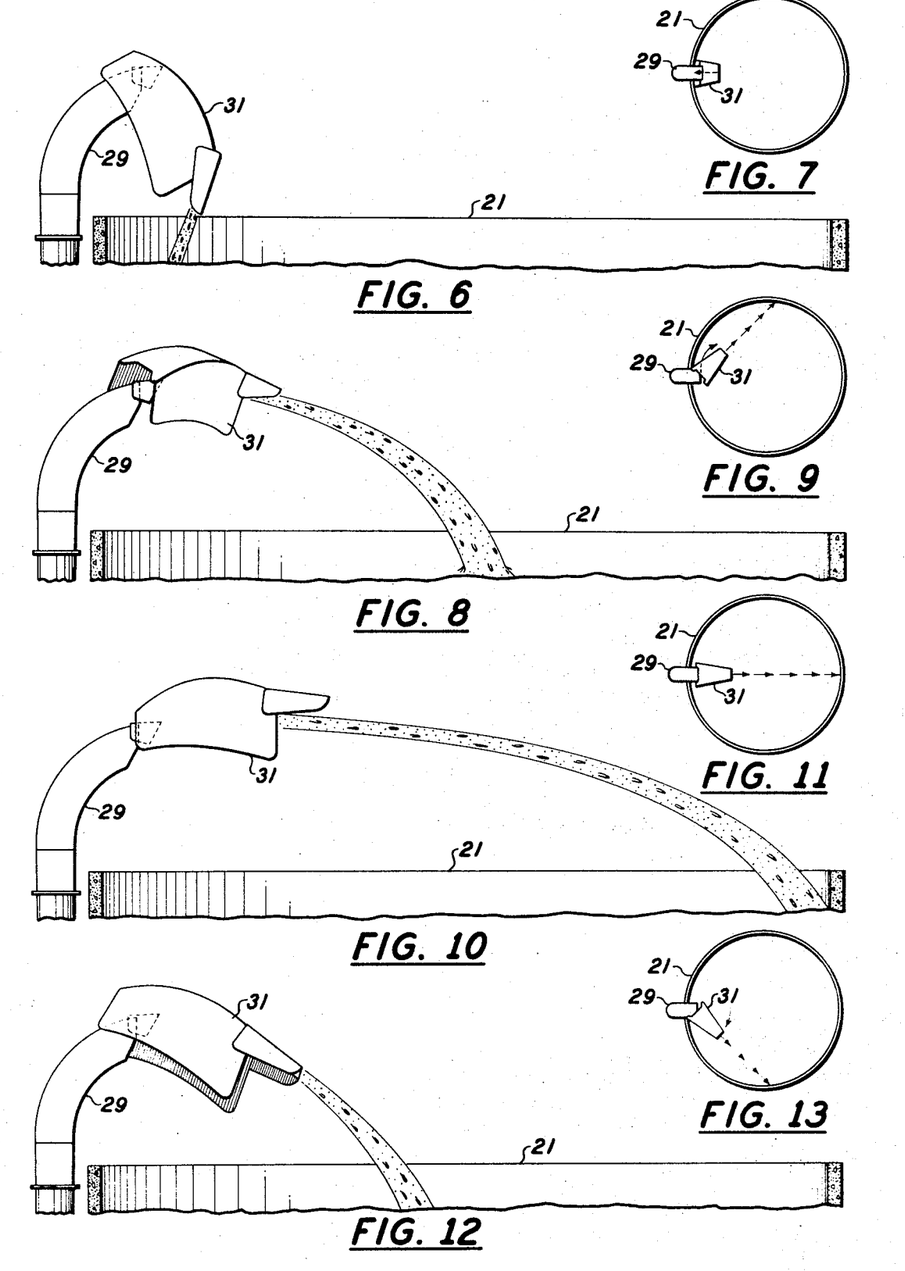
FIG. 6 is a schematic diagram illustrating the deflecting action of the distributor in the zero orbital position, distributing silage to the near side of the silo, this position corresponding to the position shown in FIG. 1.
FIG. 7 is a schematic plan of the silo with the distributor in the position shown in FIG. 6.
FIG. 8 is a schematic diagram similar to FIG. 6, but with the distributor moved to the 90° position in its orbit, to distribute silage to the left hand side of the silo, this position corresponding to that shown in FIGS. 4 and 5.
FIG. 9 is a schematic plan of the silo with the distributor in the same position shown in FIG. 8.
FIG. 10 is a schematic diagram similar to FIGS. 6 and 8, showing the distributor moved to the 180° position in its orbit, to distribute silage to the far side of the silo, this position corresponding to that shown in FIG. 2.
FIG. 11 is a schematic plan of the silo with the distributor in the same position shown in FIG. 10.
FIG. 12 is a schematic diagram similar to FIGS. 6, 8, and 10, illustrating the distributor moved to the 270° position in its orbit, to distribute silage to the right side of the silo.
FIG. 13 is a schematic plan of the silo with the distributor in the same position shown in FIG. 12.

Referring now to FIGS. 6—13, these are schematic views illustrating various positions of the deflecting chutes at different times in the orbital cycle of movement, and the resulting placement of the stream of silage being delivered into the silo. FIGS. 6 and 7, side view and top plan view, respectively, show the parts in what may be called the starting position or zero position of the cycle, which corresponds to the position shown in greater mechanical detail in FIG. 1. In this position, the chutes 31 and 33 are in their lowermost position, and are on the vertical reference plane, and the silage is being delivered straight downwardly and backwardly toward the near wall of the silo.

At the end of about one-quarter of the cycle, the parts will be in the position shown schematically in FIGS. 8 and 9, the chutes being raised considerably upwardly from the position of FIGS. 6 and 7, but not at the extreme upward position. Also, the deflecting chutes will be tilted obliquely so that the open bottom of the main chute faces downwardly and leftwardly, as well as the chute being swung to its left limit of motion, and the silage will be delivered against the left part of the wall of the silo. This may be described for convenience as the 90° position, meaning that the crank arm 85 has turned 90° from its initial zero position of FIG. 1. This 90° position is shown in greater mechanical detail in FIGS. 4 and 5.

The 180° position is illustrated schematically in FIGS. 10 and 11. Here, the arm 85 has turned through 180° from the initial zero position, and the chutes are pointing straight forwardly, in the vertical reference plane, delivering silage to the far side of the silo. This corresponds to the position shown in FIG. 2.

Next, FIGS. 12 and 13 illustrate the parts in what may be called the 270° position, with the arm 85 turned through three-quarters of a complete revolution from its initial starting position. The chutes are now swung bodily to the right and also tilted obliquely to the right, silage being delivered to the right hand portion of the silo area.

As the rotation of the arm 85 continues, it swings on from its 270° position to its zero or starting position, bringing the parts back to the positions shown in FIGS. 1, 6, and 7.

Figure 14:
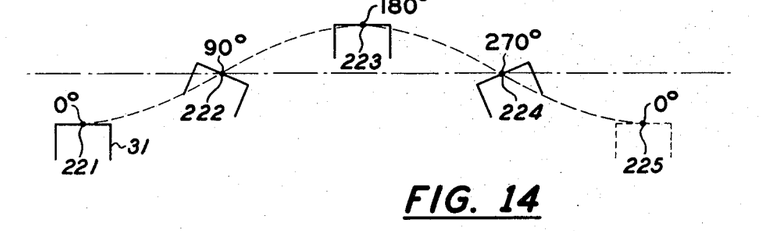
FIG. 14 is a schematic diagram illustrating the side to side tilting action of the main deflector or chute as it reaches various positions in its orbital movement.

The lateral tilting of the chute is indicated schematically in FIG. 14. At the left side of FIG. 14, the chute shown schematically at 31 is in its lowest position 221, with no lateral tilt. This is the position corresponding to FIGS. 1 and 6. As the cycle progresses, the chute is elevated and also tilts to the left, as indicated at 222, this being approximately the 90° position, shown also in FIGS. 8 and 9. As the cycle continues and the crank arm 85 reaches the 180° position, the chute in the diagram of FIG. 14 reaches the position 223, which is its highest position and it again points straight ahead, with no lateral tilt, this corresponding to FIGS. 2 and 10. Again, continuance of the cycle to the 270° position brings the chute somewhat downwardly and tilts it to the right, to the position shown at 224 in FIG. 14, this being also the position of FIG. 12. Finally, when the complete cycle is finished to 360°, back to the zero or starting position, the chute is lowered to its lowest position and straightened out with no lateral tilt, this being indicated at 225 at the right hand edge of FIG. 14, which is the same as the starting position 221 at the left hand edge.

Figures 15, 16:
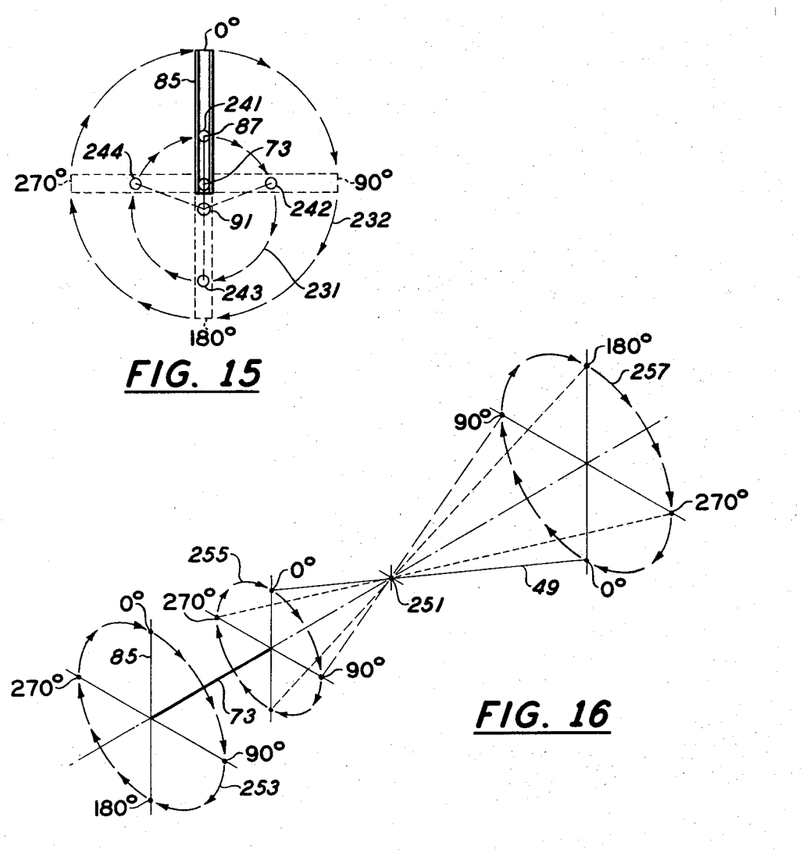
FIG. 15 is a schematic diagram illustrating the acceleration and deceleration of the speed of movement of the main deflector in different parts of its orbital movement.
FIG. 16 is a schematic diagram illustrating the rotational path of certain parts of the drive mechanism, at various different positions in the orbit.

Reference is now made to FIG. 15, which is a diagram illustrating the acceleration and deceleration of the speed of travel of the deflecting chute to its various positions, as compared with the uniform or constant speed of driving the crank arm 89 from the motor 101. The diagram illustrates the shaft 91, offset downwardly or eccentrically with respect to the shaft 73 which carries the arm 85. The roller on the crank arm 89 is shown at 87, and this drives the arm 85. The circle 231 indicates the locus of the roller 87 as it revolves concentric with the shaft 91, while the circle 232 indicates the locus of the end of the arm 85, concentric with the shaft 73.

In the zero or starting position referred to in the preceding description, the arm 85 extends vertically upward in the position shown in full lines, and the driving roller 87 is in the position 241. In the 90° position, the drive roller 87 has moved to the position 242, and the arm 85 has swung clockwise through 90°, but it will be observed that the driving crank 89 carrying the drive roller 87 has only had to swing through somewhat less than 90° in order to bring the arm 85 to the 90° position. Hence this part of the motion of the arm 85 is relatively rapid, because it is accomplished by less than 90° of motion of the crank arm 89. But for moving the arm 85 from the 90° position to the 180° position (extending straight downwardly, as shown in broken lines) the crank arm 89 must travel through more than 90° to bring the roller 87 to the position shown at 243. So this part of the travel of the deflecting chute is slower, since more travel of the motor is needed.

In the third quadrant of movement, again more than 90° of movement of the crank arm 89 is needed from the 180° position to bring the driven arm 85 to the 270° position, with the drive roller 87 at the position 244. Thus again in this quadrant, the motion is relatively slow. In the final or fourth quadrant, less than 90° of travel of the crank arm 89 is needed to move the driven arm 85 from the 270° position to the 360° or zero position, so that the travel of the chute is faster.

It is through this eccentric arrangement of the drive shaft 91 with respect to the driven shaft 73, that it is possible to speed up the orbital cycle of the chute while delivering silage to the near side of the silo, and slow it down while delivering silage to the far side of the silo. This gives a more even distribution, because for a given degree of lateral swing of the chute, there is a greater area to be covered at the far side of the silo than when the chute swings laterally to an equal degree while delivering to the near side of the silo.

Finally, referring to the schematic diagram in FIG. 16, this is a diagram which is believed to aid in understanding the motion of the control rod 49 as it goes around its orbit. In this view, the point 251 indicates the pivot point of the control rod 49 about which the rod can swing in any direction, this point being the intersection of the axis of the vertical pivot of the yoke 43 with the axis of the horizontal pins 45 in this yoke. The circle 253 indicates the locus of the outer end of the arm 85 as it swings around its shaft 73. The circle 255 indicates the locus of the circular movement of the pivotal connection between the arm 75 and the rear end of the rod 49, this being the intersection of the radial axis (radial with respect to the shaft 73) on which the yoke 77 pivots relative to the arm 75, with the axis of the yoke pins 79 which connect with the sleeve 81 on the rear end of the rod 49. The circle 257 indicates the locus of the front end of the rod 49 as it swings around through its orbital movement.

When the arm 85 is in its zero or starting position, it stands upright in the position illustrated in FIG. 1, and the position identified by the designation 0° on the circle 253 in FIG. 16. It should be understood that mention of the starting position or zero position, here and in other parts of this specification, is purely for convenience of description of the movement. When the motor is turned off, the arm 85 could stop in any position, and when the motor is turned on again it can start up from any position, wherever it last stopped. But with the arm 85 in what is conveniently called the zero position (this position being also designated by the notation 0° in FIG. 15) the pivots 79 on the arm 75 will be in their highest position, designated at 0° on the circle 255, thus holding the rear end of the bar 49 in its highest position so that the front end thereof will be at its lowest position, indicated at 0° on the circle 257 in FIG. 16.

As the motor operates, the arm 85 moves clockwise from the 0° position to the 90° position in FIG. 15, and also from the 0° position to the 90° position on the circle 253 in FIG. 16. The arm 75 likewise moves clockwise, rightwardly and downwardly along the circle 255 from the 0° position to the 90° position there designated, similarly swinging the rear end of the control rod 49 so that the forward end thereof swings leftwardly and upwardly on the circle 257 from the zero degree position to the 90° position. This carries the chute 31 leftwardly and upwardly and at the same time tilts it obliquely, as indicated schematically in FIG. 14, moving the chute from the 221 or 0° position to the 222 or 90° position.

As the orbital motion continues, the arm 85 swings clockwise, down and leftwardly on the circle 253, from the 90° position to the 180° position, the arm 75 swings on the circle 255 from its 90° to its 180° position, the forward end of the rod 49 likewise swings through the upper left quadrant of its orbit from the indicated 90° position on the circle 257 to the 180° position, and the chute rises as shown in FIG. 14 from the 90° position at 222 to the 180° position at 223, straightened up again so it is no longer tilted.

Similarly the orbital movement continues. It is believed further description is unnecessary, the 270° position of the various parts being indicated on the circles 253, 255, and 257 in FIG. 16, and the 270° position of the arm 85 being marked in FIG. 15, and the 270° position of the chute being also indicated in FIG. 14. Finally, as the orbital motion continues, the parts come around to the end of one complete rotation, to the 360° or 0° position, indicated in all these views.

Thus, to summarize, the deflecting or distributing chute, which determines the direction in which the silage is discharged, goes through an orbit which gives excellent distribution of the silage to all parts of the area of the silo, even if the silo is of relatively large size and even when it becomes filled to capacity. This is accomplished by the combination of the orbital movement upwardly and downwardly and from side to side, plus the tilting of the chute laterally to one side or the other, plus the variation in velocity of the orbit at different parts of the orbit. The orbital movement alone, even without the feature of lateral tilting and the feature of change of velocity, is a valuable and important improvement in the art, and may be used alone if the other features are not wanted. Also, the variation in velocity in different parts of the orbit may be used without the feature of lateral tilting, and the feature of lateral tilting may be used without the variation in velocity. But for best results, these three features are used in combination with each other, all contributing together to the desirable result of smooth spreading of the silage.

The variation in velocity in different parts of the orbit is achieved, as already briefly mentioned, by the offset or eccentricity of the drive shaft 91 with relation to the driven shaft 73. The smaller the offset, the smaller the change in velocity in different parts of the orbit, and if the two shafts are in direct alinement with each other, the velocity would be the same throughout the entire orbit. The greater the offset, the greater the change in velocity, and this is why the motor 101 and shaft journal 93 are mounted for adjustment upwardly and downwardly on the stationary frame 41, to allow for adjustment of orbital velocity in accordance with the diameter of the silo where the equipment is used. The larger the diameter of the silo, the greater is the desirability of having the orbital motion slower while delivering silage to the far side of the silo, as compared with the velocity when delivering to the near side. Therefore, when using the equipment with a larger silo, the motor drive mechanism is adjusted downwardly on the stationary frame, to increase the extent of offset of the shaft 91 from the shaft 73. Of course the offset must not be so great as to preclude having the roller 87 engage the groove in the arm 85 far enough from the axis of the shaft 73 to give a good leverage to turn this shaft when the arm 85 is in its uppermost position.

What is claimed is:

1. Apparatus for distributing incoming silage and the like over the area of a silo or the like, comprising a movable chute mounted near the top of a silo substantially at one side thereof in position to receive an incoming stream of silage at one end of the chute and to deflect the stream of silage to various directions depending on the position of the chute, means mounting said chute for swinging movement about a vertical axis and also swinging movement about a horizontal axis, said vertical axis and said horizontal axis substantially intersecting each other at a point close to one edge of the silo and at a substantial distance from the center of the silo, and means for swinging said chute continuously through an approximately circular orbital movement symmetrically about an approximately horizontal axis, thereby continuously varying the direction of the chute both vertically and horizontally.

2. A construction as defined in claim 1, further comprising means for tilting said chute laterally about an axis extending in a general direction lengthwise of the chute first in one direction and then in an opposite direction as it performs its orbital swinging movement.

3. A construction as defined in claim 1, further comprising means for continuously varying the velocity of the orbital swinging movement to cause the chute to swing more slowly through that part of its orbital movement in which it directs silage toward the far side of the silo and to swing faster through that part of its orbital movement in which it directs silage toward the near side of the silo.

4. A construction as defined in claim 1, further comprising a supplementary chute pivotally mounted on the discharge end of the first mentioned chute, and means responsive to swinging movement of said first mentioned chute for swinging said supplementary chute relative to said first mentioned chute.

5. Apparatus for distributing incoming silage and the like over the area of a silo or the like, comprising a movable chute adapted to be mounted near the top of a silo near one side thereof in position to receive an incoming stream of silage at one end of the chute and to deflect the stream of silage to various directions depending on the position of the chute, characterized by the novel feature of means for swinging said chute continuously through an orbital movement including continuously varying the direction of the chute both vertically and horizontally, said means for swinging said chute comprising a control rod mounted for universal pivotal movement at an intermediate point between a rear end and a forward end, means for swinging the rear end of said rod continuously through a circular orbit, and means for mounting said chute on the forward end of said rod to swing therewith through a circular orbit when the rear end of said rod is swung through its orbit.

6. A construction as defined in claim 5, in which the means for swinging the rear end of said rod includes means for swinging said rear end relatively faster during one part of each circular orbit and relatively slower during a different part of each circular orbit.

7. Apparatus for distributing incoming silage and the like over the area of a silo or the like, comprising a movable chute adapted to be mounted near the top of a silo near one side thereof in position to receive an incoming stream of silage at one end of the chute and to deflect the stream of silage to various directions depending on the position of the chute, a control rod mounted for universal pivotal movement at an intermediate point between a rear end and a forward end, means for swinging the rear end of said rod continuously through a circular orbit, and means for mounting said chute on the forward end of said rod to swing therewith through a circular orbit when the rear end of said rod is swung through its orbit, said means for swinging the rear end of said rod including a drive shaft having a radial drive arm, a driven shaft parallel to and offset radially from said drive shaft, said driven shaft being substantially aligned axially with the universal pivotal movement mounting of said control rod, a first radial arm on said driven shaft, a driving connection between said drive arm and said first radial arm to drive the latter from rotation of the former, a second radial arm on said driven shaft, and a driving connection between said second radial arm and said rear end of said control rod, to drive said control rod through its orbit from rotation of said second radial arm, the radial offsetting of said drive shaft and said driven shaft from each other serving to cause the rear end of said control rod to be swung faster during one part of each circular orbit and slower during a different part of each circular orbit while said drive shaft is rotated at a uniform rate.

8. A construction as defined in claim 5, further including means for twisting said control rod on its own axis, first in one direction and then in the opposite direction, as the control rod swings through its circular orbit, thereby to tilt the chute mounted on said rod laterally first to one side and then to the opposite side.

9. A construction as defined in claim 8, in which said means for twisting said control rod includes a pivoted frame 135 swingable upwardly and downwardly and held against movement in a horizontal direction laterally of said control rod, a member 125 pivoted to said control rod to swing in a predetermined plane extending axially and radially with respect to said control rod and restrained against lateral movement out of such plane, and a pivotal connection 127, 129, 133 between said member 125 and said frame 135 at a substantial distance from said rod to prevent the portion of said member which is pivoted to said frame from moving horizontally laterally, so that when the portion of said rod to which said member is pivoted swings rightwardly during its orbital movement the action of said member will twist said rod to the left and when said portion of said rod swings leftwardly the action of said member will twist said rod to the right.

10. A construction as defined in claim 1, in which said incoming stream of silage arrives at said chute moving approximately horizontally, and in which said chute in the highest position of its orbital movement permits said stream to continue approximately horizontally toward the opposite side of the silo and in the lowest position of its orbital movement deflects said stream approximately vertically downwardly toward the near side of the silo.

11. Movable chute mechanism for distributing flowable material into the area of a receptacle, said mechanism comprising a support structure mounted intermediate its end for universal swinging movement in any direction about a fixed point, a chute mounted on the forward end of said support structure to swing therewith so as to direct flowable material passing through said chute into various different directions as the chute swings with the support structure, and driving means operatively connected to the rear end of said support structure for swinging said rear end continuously through a circular path to cause corresponding circular swinging of the front end of said structure and the chute mounted thereon.

12. Mechanism as defined in claim 11, further comprising a link having one end connected to said support structure at a point spaced longitudinally from said fixed point, said one end of said link swinging laterally with said structure as said structure swings, and means restraining lateral motion of the other end of said link, whereby the lateral swinging of the connected end of said link relative to the restrained end thereof will cause said link to tilt laterally first in one direction and then in an opposite direction as said structure continues its circular swinging motion, and means transmitting the lateral tilting motion of said link to said structure, thereby to cause lateral tilting of said support structure and said chute mounted thereon, first in one direction and then in the opposite direction during the circular swinging motion of said structure.

13. Mechanism as defined in claim 11, further comprising a supplementary deflector pivotally mounted on the discharge end of said chute for upward and downward swinging motion relative thereto, and link means operatively connected to said deflector and to said chute and to a stationary member for causing upward swinging of said deflector relative to said chute as said chute swings upwardly and causing downward swinging of said deflector relative to said chute as said chute swings downwardly.

* * * * *